(12) United States Patent
Gu

(10) Patent No.: US 8,705,011 B2
(45) Date of Patent: Apr. 22, 2014

(54) DIGITAL STEREO IMAGING PHOTOSENSITIVE DEVICE FOR A GRATING AND A PHOTOSENSITIVE MATERIAL AND ITS METHOD

(76) Inventor: Jinchang Gu, Shanghai (CN)

( * ) Notice: Subject to any disclaimer, the term of this patent is extended or adjusted under 35 U.S.C. 154(b) by 354 days.

(21) Appl. No.: 13/140,339

(22) PCT Filed: Dec. 16, 2009

(86) PCT No.: PCT/CN2009/075656
§ 371 (c)(1),
(2), (4) Date: Jun. 16, 2011

(87) PCT Pub. No.: WO2010/069256
PCT Pub. Date: Jun. 24, 2010

(65) Prior Publication Data
US 2011/0249249 A1 Oct. 13, 2011

(30) Foreign Application Priority Data
Dec. 17, 2008 (CN) .......................... 2008 1 0204798

(51) Int. Cl.
| G03B 27/04 | (2006.01) |
| G03B 27/02 | (2006.01) |
| G03B 35/14 | (2006.01) |
| G03B 27/58 | (2006.01) |
| G03B 27/42 | (2006.01) |
| G03B 27/20 | (2006.01) |

(52) U.S. Cl.
USPC .................. 355/95; 355/22; 355/53; 355/72; 355/78; 355/91; 355/132

(58) Field of Classification Search
USPC ......... 355/22, 53, 72–77, 78, 91, 94, 95, 132; 430/311, 320, 321, 322; 348/42; 396/324, 335, 338, 340; 700/120
See application file for complete search history.

(56) References Cited

U.S. PATENT DOCUMENTS

| 5,484,314 | A | * | 1/1996 | Farnworth | ...................... | 445/24 |
| 5,573,877 | A | * | 11/1996 | Inoue et al. | ...................... | 430/30 |
| 5,657,111 | A | * | 8/1997 | Lo | ...................... | 355/22 |
| 6,031,597 | A | * | 2/2000 | Knirck et al. | ...................... | 355/53 |
| 2007/0139633 | A1 | * | 6/2007 | Bleeker et al. | ...................... | 355/67 |
| 2010/0031833 | A1 | * | 2/2010 | Kasumi et al. | ...................... | 101/4 |

FOREIGN PATENT DOCUMENTS

CN  1131752 A  *  9/1996

OTHER PUBLICATIONS

English translation of CN 1131752, published on Sep. 25, 1996.*

* cited by examiner

*Primary Examiner* — Toan Ton
*Assistant Examiner* — Christina Riddle

(57) ABSTRACT

A digital stereo imaging photosensitive device for a grating and a photosensitive material, includes: a photosensitive platform (8), connected with a base via a platform moving mechanism; a compressing mechanism (7) mounted on the photosensitive platform, wherein a grating (5) is positioned on the compressing mechanism; a LCD displayer (2) suspending above the photosensitive platform; and a lens suspending above the photosensitive platform via a lens moving mechanism, wherein the lens is under the LCD displayer. And a method for digital stereo projection is also provided.

2 Claims, 2 Drawing Sheets

DIGITAL STEREO IMAGING PHOTOSENSITIVE DEVICE FOR A GRATING AND A PHOTOSENSITIVE MATERIAL AND ITS METHOD

BACKGROUND OF THE PRESENT INVENTION

1. Field of Invention

The present invention relates to a digital stereo imaging photosensitive device for a grating and a photosensitive material and its method.

2. Description of Related Arts

The present method using the silver halide medium material to produce stereopictures in the market is still a conventional method of years ago. The method combines the grating and the photosensitive material before projection and sensitization, and then develops to obtain the stereopictures. However, the method has two drawbacks. The first drawback is that the photosensitive material must be combined with the grating before projection and sensitization and developing, the grating material is too thick to be folded for developing, and thus a large plane developing device, which is longer than 10 meters, is produced to develop correspondingly, which brings great inconvenience for developing, consumes a great deal of flushing lotion for forcing spraying and flushing upwardly, consumes lotion and time, takes a large space, pollutes the environment, and causes complicated operation, low success rate and bad effect. Additionally, since the grating and the photosensitive material combined beforehand has a double-faced film layer therebetween, the transparency of projection and sensitization is weakened to affect the contract and transmission effect of the stereopictures. The second drawback is that the carrier is the combined photosensitive material combined by the grating and the photosensitive material, which relies on import and is very expensive, and therefore the stereopictures market has high cost to be popularized and spread.

SUMMARY OF THE PRESENT INVENTION

Technical Problem

A technical problem to be solved by the present invention is to overcome the drawback in the prior art, and provide a digital stereo imaging photosensitive device for a grating and a photosensitive material and its method.

Technical Proposal

In order to solve the technical problem, the present invention provides:

A digital stereo imaging photosensitive device for a grating and a photosensitive material, which is characterized in, comprising:

a photosensitive platform, connected with a base via a platform moving mechanism;

a compressing mechanism mounted on the photosensitive platform, wherein a grating is positioned on the compressing mechanism;

a LCD displayer suspending above the photosensitive platform; and a lens suspending above the photosensitive platform via a lens moving mechanism, wherein the lens is under the LCD displayer.

The present invention further provides a method for digital stereo imaging with the digital stereo imaging photosensitive device for a grating and a photosensitive material, which is characterized in, comprising the following steps:

S1: positioning a grating fixedly between the photosensitive platform and the compressing mechanism, positioning the photosensitive material between the photosensitive platform and the grating, compressing the grating and the photosensitive material on the photosensitive platform via the compressing mechanism;

S2: displaying an image of a view taken by a camera by the LCD displayer, and processing a first projection and sensitization by projection on the photosensitive material through the grating with the lens;

S3: after the first projection and sensitization, switching to another image of a different view, moving the lens for a distance, and then moving the photosensitive platform and the photosensitive lens in a same direction for a distance until an area requiring sensitization on the photosensitive platform is covered by a light cast by the lens again, and then processing a second projection and sensitization;

S4: repeating the step S3 until all images of different views finish projection and sensitization, wherein a number of times of projection and sensitization is determined by a number of the stereopictures of different views taken by the stereocamera;

S5: releasing the compressing mechanism to separate the grating and the photosensitive material;

S6: developing the photosensitive material; and

S7: combining the photosensitive material developed in the step S6 with the grating by adding a film.

Beneficial Effect

The positive beneficial effect of the present invention is as follows. The digital stereo imaging photosensitive device for a grating and a photosensitive material is capable of separating the photosensitive material and the grating after projection and sensitization, so that an ordinarily developing device can be used to develop. Besides, the photosensitive material can be common silver halide photosensitive material, which is cheap and easy to be promoted. Furthermore, a double-faced film layer in the photosensitive material combined by the conventional method during projection and sensitization is not needed, the color contract of the stereopictures according to the present invention is better than that of the prior art combining the grating with the photosensitive material before projection.

DETAILED DESCRIPTION OF THE PREFERRED EMBODIMENT

Figure 1:
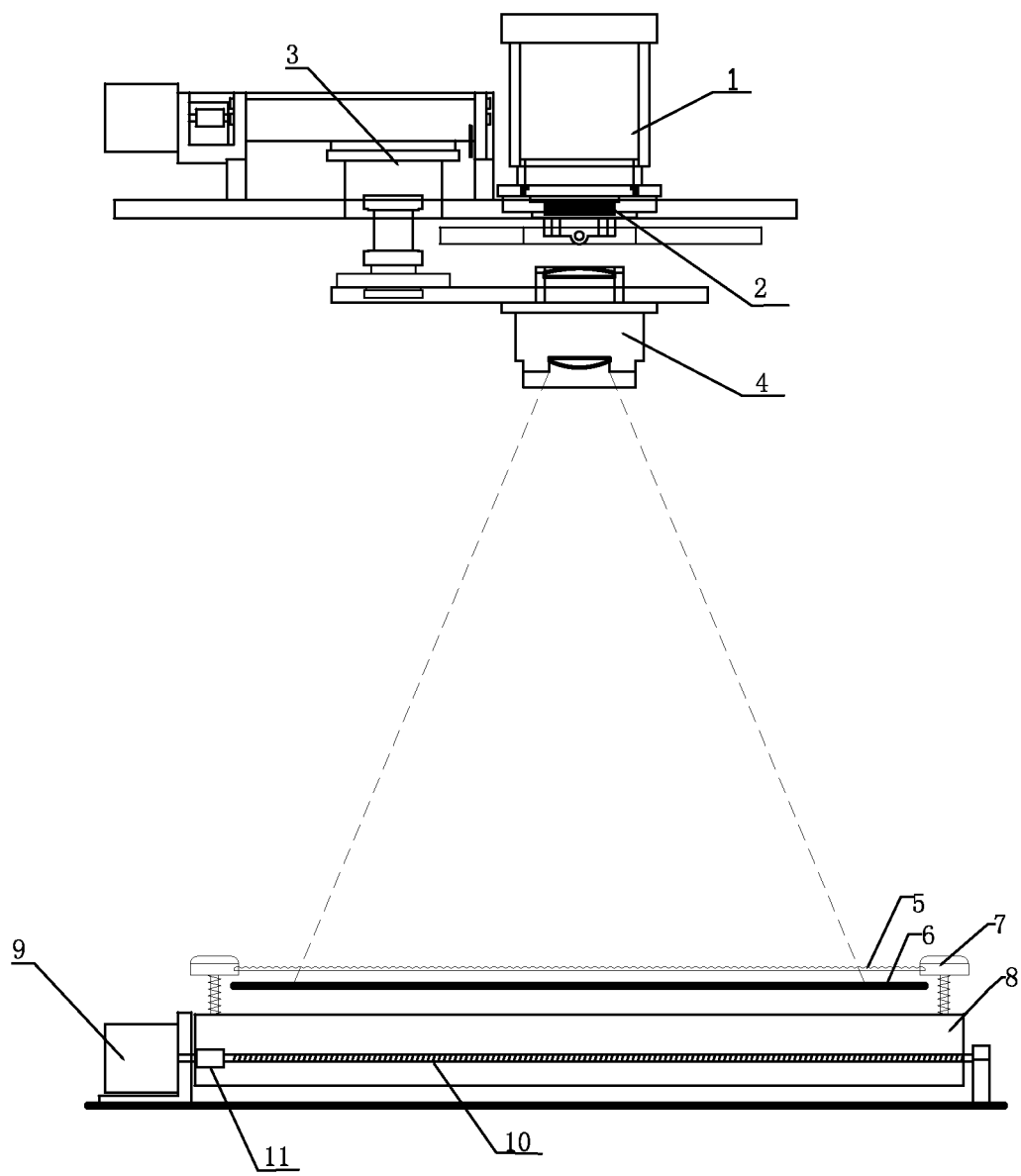
FIG. 1 is a perspective view of a digital stereo imaging photosensitive device for a grating and a photosensitive material according to a preferred embodiment of the present invention.

A preferred embodiment of the present invention is described by accompanied with the drawing.

FIG. 1 is a side sectional view of a digital stereo imaging photosensitive device for a grating and a photosensitive material according to the present invention. A light source device 1 projects on a grating 5 and a photosensitive material 6 through a LCD displayer 2 and a lens 4 for sensitization.

Since images taken by a stereocamera is at least two, after one image finishes projection and sensitization, a photosensitive platform 8 and the lens 4 move in a same direction by proportion for next projection and sensitization. A distance that the lens 4 moves accords to a photosensitive angle corresponding to different views of the stereocamera when taking photos, i.e., the bigger the views change, the bigger the distance is. The photosensitive platform 8 movably mounted on an assembling surface via a platform moving mechanism. The platform moving mechanism comprises an electromotor 9 connected with a guide screw 10 via a moving connector 11. A sliding block corresponding to the guide screw 10 is provided on a bottom of the photosensitive platform 8, and the photosensitive platform 8 is moved by the guide screw 10 driven by the electromotor 9. The photosensitive platform 8 move to ensure that a light cast by the lens 4 after moving covers on an area requiring projection again. The LCD displayer 2 is controlled by a computer to switch images after each time the lens 4 and the photosensitive platform 8 move, so that the lens 4 displays a next image on the LCD displayer 2. The lens 4 is moved via a lens moving mechanism 3 which can be gears transmission or guide screw transmission. A compressing mechanism 7 mounted on the photosensitive platform 8 fixes the grating 5 and the photosensitive material 6 on the photosensitive platform 8, so as to maintain the grating 5 and the photosensitive material 6 in level to make the area requiring projection attach to the photosensitive platform 8 firmly to ensure a projection effect. After moving, sensitization of a second image is processed. In each time of sensitization, the photosensitive platform 8 and the lens 4 move in a same direction by proportion. A number of stereopictures is the number of moving. Therefore, a projection photo of a scene from different views is formed on the photosensitive material 6, and a stereopicture is obtained by developing, drying and adding a film to the photosensitive material 6 after sensitization.

Figure 2:
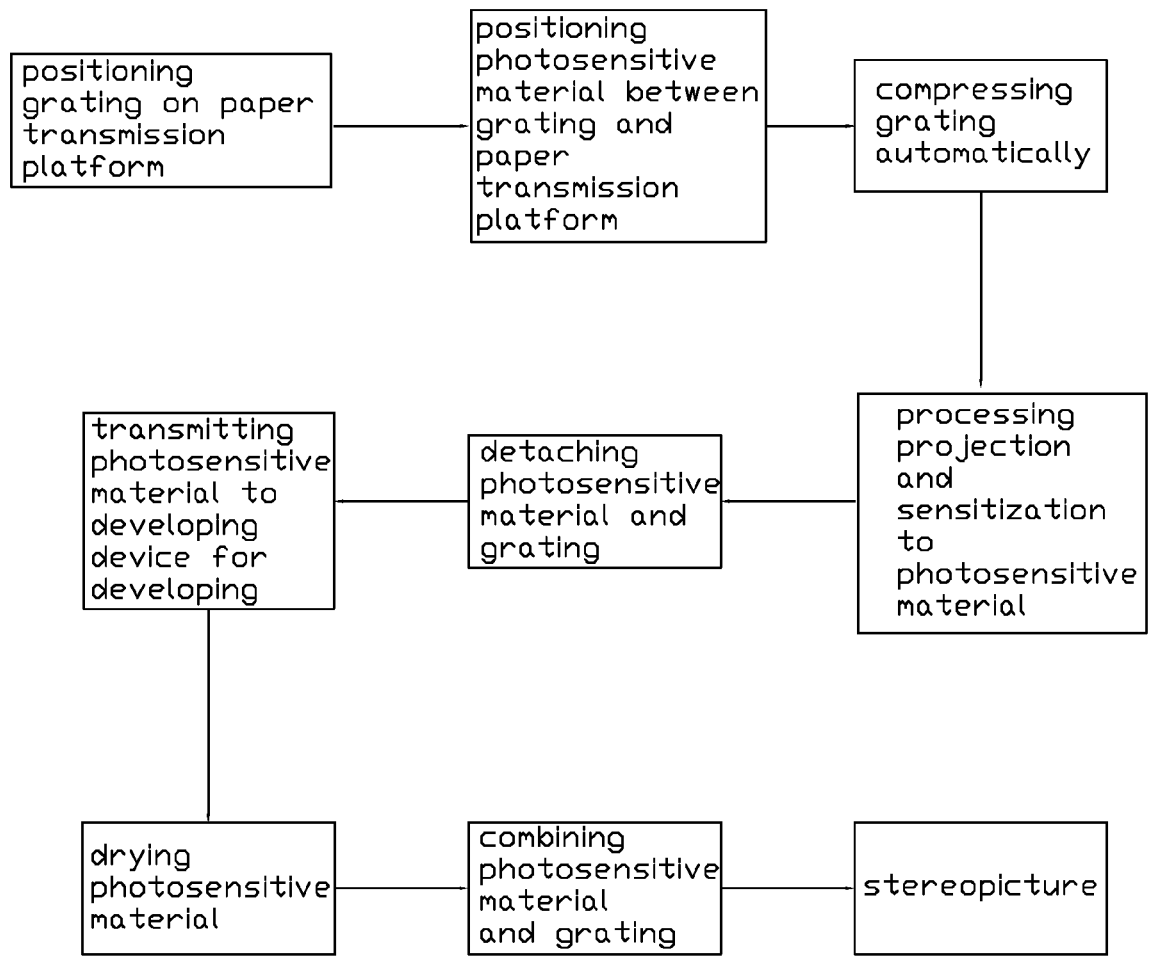
FIG. 2 is a flowchart of a method for digital stereo imaging according to the preferred embodiment of the present invention.

FIG. 2 illustrates a method of digital stereo imaging, comprising:

positioning a grating between a photosensitive platform and a compressing mechanism, then positioning a photosensitive material between the grating and the photosensitive platform, and compressing the grating and the photosensitive material on the photosensitive platform firmly;

processing projection and sensitization to the photosensitive material;

detaching the grating and the photosensitive material by releasing the compressing mechanism, and developing the photosensitive material after sensitization; and drying a photo developed, and forming a stereopicture by combining the dried photo with the grating and adding a film.

The step of processing projection and sensitization to the photosensitive material comprises:

S1: fixing the grating between the photosensitive platform and the compressing mechanism, positioning the photosensitive material between the grating and the photosensitive platform, and compressing the grating and the photosensitive material on the photosensitive platform firmly;

S2: displaying an image of a view taken by a camera, and processing a first projection and sensitization by projection on the photosensitive material through the grating with the lens; and S3: after the first projection and sensitization, switching to another image of different view by a computer, moving the lens for a distance, and then moving the photosensitive platform and the photosensitive lens in a same direction for a distance until an area requiring sensitization on the photosensitive platform is covered by a light cast by the lens again, and then processing a second projection and sensitization;

S4: repeating the step S3 until all images of different views finish projection and sensitization, wherein a number of times of projection and sensitization is determined by a number of the stereopictures of different views taken by the stereocamera;

S5: releasing the compressing mechanism to separate the grating and the photosensitive material;

S6: developing the photosensitive material; and

S7: combining the photosensitive material developed in the step S6 with the grating by adding a film.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A digital stereo imaging photosensitive device for a grating and a photosensitive material, comprising:

a photosensitive platform, connected with a base via a platform moving mechanism;

a compressing mechanism mounted on said photosensitive platform, wherein a grating is positioned on said compressing mechanism;

a LCD displayer suspended above said photosensitive platform; and a lens suspended above said photosensitive platform via a lens moving mechanism, wherein said lens is under said LCD displayer, wherein after one image finishes projection and sensitization, said photosensitive platform and said lens move in a same direction by proportion for next projection and sensitization.

2. A method for digital stereo projection with the digital stereo imaging photosensitive device for the grating and the photosensitive material, as recited in claim 1, comprising the following steps:

S1: positioning a grating fixedly between the photosensitive platform and the compressing mechanism, positioning the photosensitive material between the photosensitive platform and the grating, compressing the grating and the photosensitive material on the photosensitive platform via the compressing mechanism;

S2: displaying an image of a view taken by a camera by the LCD displayer, and processing a first projection and sensitization by projection on the photosensitive material through the grating with the lens;

S3: after the first projection and sensitization, switching to another image of a different view, moving the lens for a distance, and then moving the photosensitive platform and the photosensitive lens in a same direction for a distance until an area requiring sensitization on the photosensitive platform is covered by a light cast by the lens again, and then processing a second projection and sensitization;

S4: repeating the step S3 until all images of different views finish projection and sensitization, wherein a number of times of projection and sensitization is determined by a number of the stereopictures of different views taken by a stereocamera;

S5: releasing the compressing mechanism to separate the grating and the photosensitive material;

S6: developing the photosensitive material; and

S7: combining the photosensitive material developed in the step S6 with the grating by adding a film.

\* \* \* \* \*